US011436016B2

(12) United States Patent
Gutierrez et al.

(10) Patent No.: US 11,436,016 B2
(45) Date of Patent: Sep. 6, 2022

(54) TECHNIQUES FOR IMPROVING OPERAND CACHING (71) Applicant: Advanced Micro Devices, Inc., Santa Clara, CA (US)

(72) Inventors: Anthony T. Gutierrez, Bellevue, WA (US); Bradford M. Beckmann, Bellevue, WA (US); Marcus Nathaniel Chow, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 108 days.

(21) Appl. No.: 16/703,833

(22) Filed: Dec. 4, 2019

(65) Prior Publication Data

US 2021/0173650 A1 Jun. 10, 2021

(51) Int. Cl.
G06F 9/30 (2018.01)
G06F 9/38 (2018.01)

(52) U.S. Cl.
CPC ...... *G06F 9/30145* (2013.01); *G06F 9/30047* (2013.01); *G06F 9/30098* (2013.01); *G06F 9/3838* (2013.01); *G06F 9/3844* (2013.01)

(58) Field of Classification Search
CPC ............. G06F 9/30145; G06F 9/30047; G06F 9/30098; G06F 9/3838; G06F 9/3844
See application file for complete search history.

(56) References Cited

U.S. PATENT DOCUMENTS

| 5,535,350 A | 7/1996 | Maemura | |
|---|---|---|---|
| 8,402,223 B2* | 3/2013 | Birka | G06F 12/121 711/133 |
| 8,954,678 B2* | 2/2015 | Averbouch | G06F 12/0862 711/133 |
| 9,430,384 B2* | 8/2016 | Rozas | G06F 12/0875 |
| 9,459,869 B2* | 10/2016 | Olson | G06F 9/38 |
| 9,569,367 B1* | 2/2017 | Wigmore | G06F 12/0897 |
| 9,619,394 B2* | 4/2017 | Havlir | G06F 12/0875 |
| 9,652,233 B2* | 5/2017 | Potter | G06F 9/38 |
| 9,734,080 B2 | 8/2017 | Wilson | |
| 10,152,410 B2* | 12/2018 | Solihin | G06F 12/126 |
| 10,255,182 B2* | 4/2019 | Kim | G06F 12/0862 |
| 10,678,548 B2* | 6/2020 | Kenney | G06F 9/3832 |
| 10,762,000 B2* | 9/2020 | Chang | G06F 12/0868 |
| 2019/0073305 A1* | 3/2019 | Hijaz | G06F 12/128 |

OTHER PUBLICATIONS

Butts, J. A., & Sohi, G. S., "Use-Based Register Caching with Decoupled Indexing", Proceedings of the 31st International Symposium on Computer Architecture, 12 pgs., Jun. 2004.

* cited by examiner

*Primary Examiner* — Cheng Yuan Tseng (74) *Attorney, Agent, or Firm* — Volpe Koenig (57) ABSTRACT

A technique for determining whether a register value should be written to an operand cache or whether the register value should remain in and not be evicted from the operand cache is provided. The technique includes executing an instruction that accesses an operand that comprises the register value, performing one or both of a lookahead technique and a prediction technique to determine whether the register value should be written to an operand cache or whether the register value should remain in and not be evicted from the operand cache, and based on the determining, updating the operand cache.

20 Claims, 7 Drawing Sheets

TECHNIQUES FOR IMPROVING OPERAND CACHING

STATEMENT OF GOVERNMENT INTEREST

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

Programmable processors include instruction execution pipelines for executing instructions. Such pipelines include a register file that stores register values used by the instructions. Improvements to operations of the register file are constantly being made.

BRIEF DESCRIPTION OF THE DRAWINGS

A more detailed understanding is provided by the following description, given by way of example in conjunction with the accompanying drawings wherein.

DETAILED DESCRIPTION

A technique for determining whether a register value is to exist in an operand cache. The technique includes executing an instruction that accesses an operand that comprises the register value, performing one or both of a lookahead technique and a prediction technique to determine whether the register value is to exist in the operand cache, and based on the determining, updating the operand cache.

Figure 1:
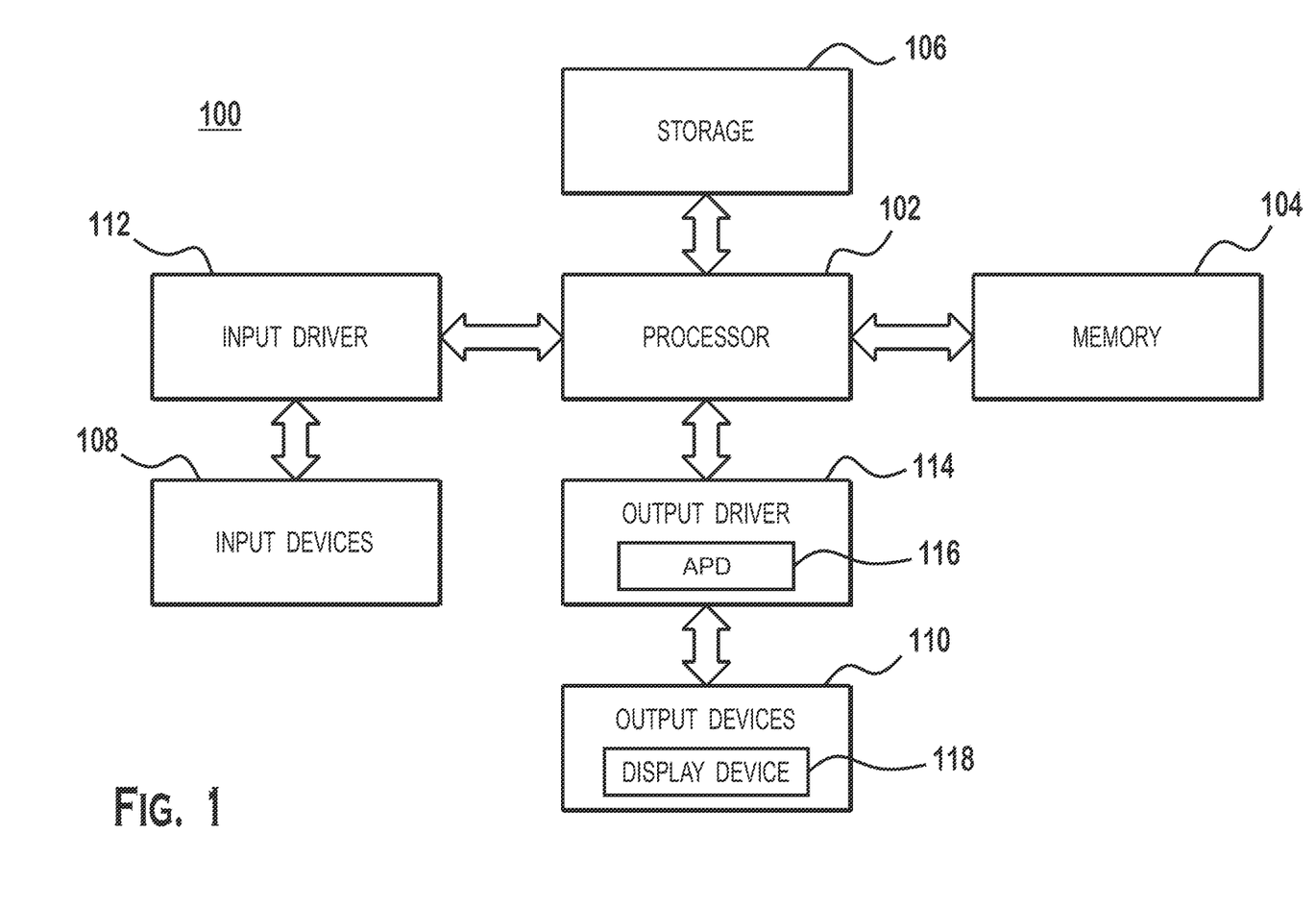
FIG. 1 is a block diagram of an example device in which one or more features of the disclosure can be implemented.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 includes additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is coupled to a display device 118. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide (graphical) output to a display device 118. For example, it is contemplated that any processing system that performs processing tasks in accordance with a SIMD paradigm can be configured to perform the functionality described herein.

Figure 2:
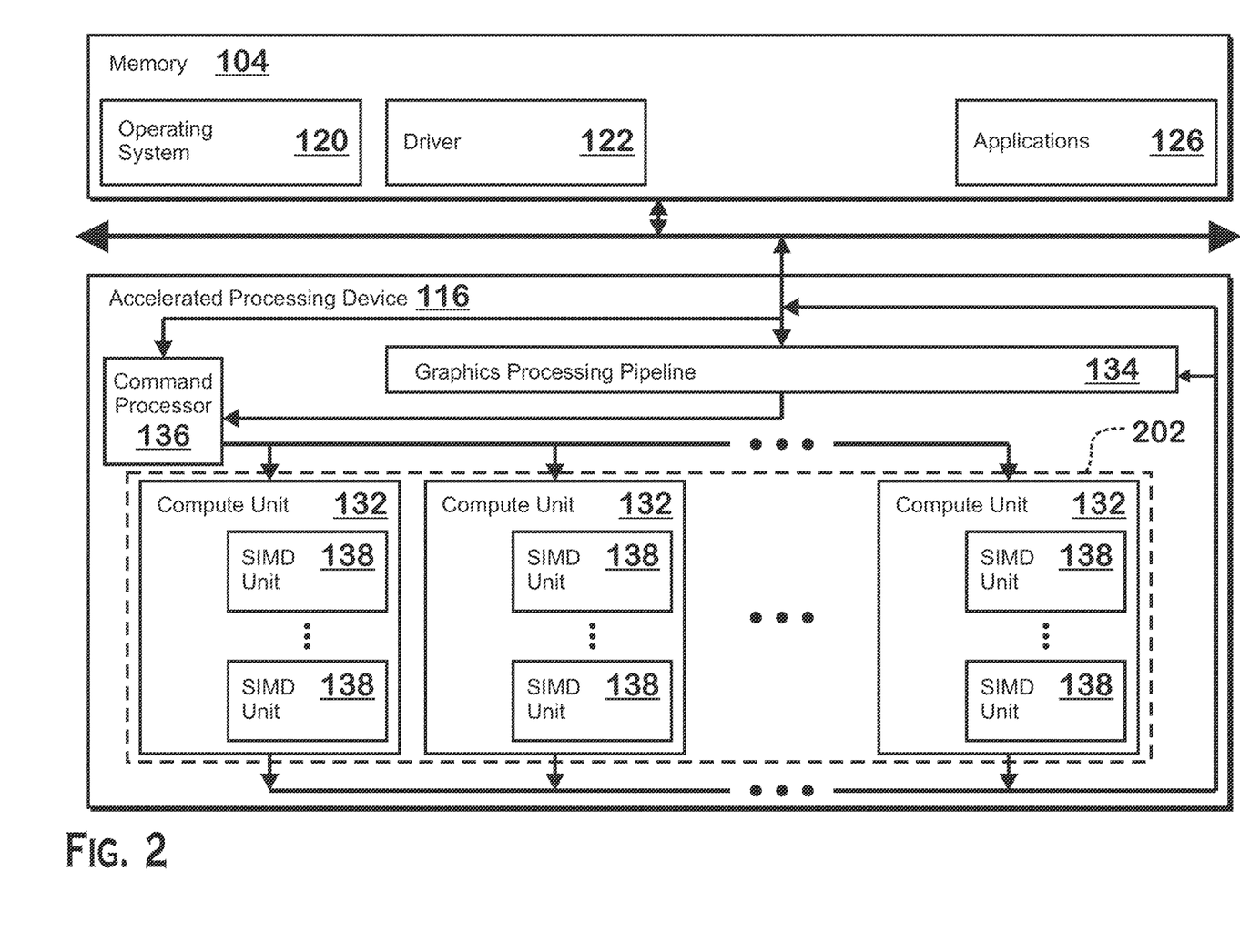
FIG. 2 is a block diagram of the device of FIG. 1, illustrating additional details related to execution of processing tasks on an accelerated processing device, according to an example.

FIG. 2 is a block diagram of the device 100, illustrating additional details related to execution of processing tasks on the APD 116, according to an example. The processor 102 maintains, in system memory 104, one or more control logic modules for execution by the processor 102. The control logic modules include an operating system 120, a driver 122, and applications 126. These control logic modules control various features of the operation of the processor 102 and the APD 116. For example, the operating system 120 directly communicates with hardware and provides an interface to the hardware for other software executing on the processor 102. The driver 122 controls operation of the APD 116 by, for example, providing an application programming interface ("API") to software (e.g., applications 126) executing on the processor 102 to access various functionality of the APD 116. In some implementations, the driver 122 includes a just-in-time compiler that compiles programs for execution by processing components (such as the SIMD units 138 discussed in further detail below) of the APD 116. In other implementations, no just-in-time compiler is used to compile the programs, and a normal application compiler compiles shader programs for execution on the APD 116.

The APD 116 executes commands and programs for selected functions, such as graphics operations and non-graphics operations that are suited for parallel processing and/or non-ordered processing. The APD 116 is used for executing graphics pipeline operations such as pixel operations, geometric computations, and rendering an image to display device 118 based on commands received from the processor 102. The APD 116 also executes compute processing operations that are not related, or not directly related to graphics operations, such as operations related to video, physics simulations, computational fluid dynamics, or other tasks, based on commands received from the processor 102. The APD 116 also executes compute processing operations that are related to ray tracing-based graphics rendering.

The APD 116 includes compute units 132 that include one or more SIMD units 138 that perform operations at the request of the processor 102 in a parallel manner according to a SIMD paradigm. The compute units 132 are sometimes referred to collectively herein as "parallel processing units 202." The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but executes that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. In an implementation, each of the compute units 132 can have a local L1 cache. In an implementation, multiple compute units 132 share a L2 cache.

The basic unit of execution in compute units 132 is a work-item. Each work-item represents a single instantiation of a program that is to be executed in parallel in a particular lane. Work-items can be executed together as a "wavefront" on a single SIMD processing unit 138. The SIMD nature of the SIMD processing unit 138 means that multiple work-items typically execute in parallel simultaneously. Work-items that are executed together in this manner on a single SIMD unit are part of the same wavefront. In some implementations or modes of operation, a SIMD unit 138 executes a wavefront by executing each of the work-items of the wavefront simultaneously. In other implementations or modes of operation, a SIMD unit 138 executes different sub-sets of the work-items in a wavefront in parallel. In an example, a wavefront includes 64 work-items and the SIMD unit 138 has 16 lanes (where each lane is a unit of the hardware sized to execute a single work-item). In this example, the SIMD unit 138 executes the wavefront by executing 16 work-items simultaneously, 4 times.

One or more wavefronts are included in a "workgroup," which includes a collection of work-items designated to execute the same program. An application or other entity (a "host") requests that shader programs be executed by the accelerated processing device 116, specifying a "size" (number of work-items), and the command processor 136 generates one or more workgroups to execute that work. The number of workgroups, number of wavefronts in each workgroup, and number of work-items in each wavefront correlates to the size of work requested by the host. In some implementations, the host specifies the number of work-items in each workgroup for a particular request to perform work, and this specification dictates the number of workgroups generated by the command processor 136 to perform the work. As stated above, the command processor 136 dispatches workgroups to one or more compute units 132, which execute the appropriate number of wavefronts to complete the workgroups.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

Figure 3:
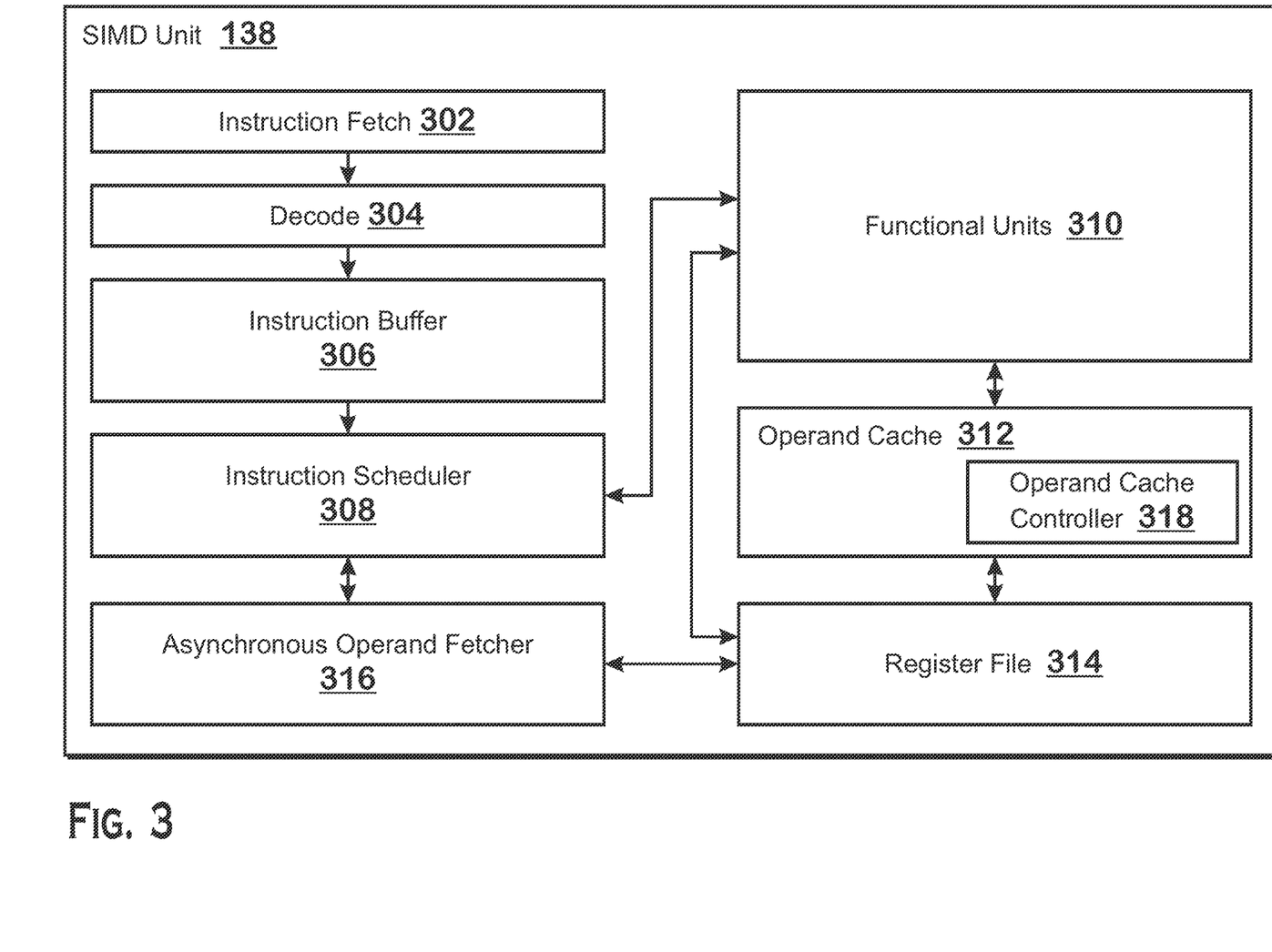
FIG. 3 is a block diagram illustrating details of a SIMD unit, according to an example.

FIG. 3 is a block diagram illustrating details of a SIMD unit 138, according to an example. The SIMD unit 138 includes an instruction fetch unit 302, a decode unit 304, an instruction buffer 306, an instruction scheduler 308, functional units 310, an operand cache 312, a register file 314, an asynchronous operand fetcher 316, and an operand cache controller 318. Note that although the description provided herein is in regards to a SIMD unit 138, it is possible to substitute the teachings herein for any technically feasible processor.

The instruction fetch unit 302 fetches instructions from memory (which, in most instances, includes an instruction cache) according to program flow. The instruction decode unit 304 decodes the instructions, to generate micro-operations for execution by the functional units 310. Note that herein, the term "instruction" is used interchangeably with the term "micro-operation" herein, in referring to micro-operations past the instruction decode 304 unit. The instruction buffer 306 stores the micro-operations output by the instruction decode unit 304. The instruction scheduler 308 schedules micro-operations in the instruction buffer 306 for execution by the functional units 310 based at least on availability of the functional units. The functional units 310 execute the micro-operations. In various examples, the functional units 310 include arithmetic logic units that perform various mathematical, bitwise, or other types of operations as specified by the micro-operations, load/store units that load values from memory and/or store values to memory, or other units that perform other operations as specified by the instructions. The register file 314 acts as a low latency scratch space memory that stores operands for the micro-operations executed by the functional units 310. Micro-operations typically specify registers of the register file 314 as input operands and/or destinations for the micro-operation results. Operands are consumed as input by some instructions to produce a result. The register file 314 includes the registers used by the micro-operations.

Much processing within the compute units 132 is vector-based processing, meaning that instructions are executed with multiple items of data for each operand. For this reason, the register file 314 is quite large. Thus, the SIMD unit 138 includes an operand cache 312 that caches at least some values of the register file 314. Because the operand cache 312 is a cache of the register file 314, in some implementations, the operand cache 312 stores fewer register values than the register file 314. For this reason, the operand cache controller 318 implements an allocation policy and a replacement policy. The allocation policy determines which register values are to be placed in the operand cache 312. The replacement policy determines which registers to evict from the operand cache 312 when a new register value is placed into the operand cache 312 and there are no free slots in the operand cache 312.

The asynchronous operand fetcher 316 asynchronously fetches operands for instructions in the instruction buffer 306. More specifically, the asynchronous operand fetcher 316 opportunistically fetches operands for instructions in the instruction buffer 306, and fetches those operands into the asynchronous operand fetcher 316 itself (which therefore includes a memory). The asynchronous operand fetcher 316 is capable of fetching operands from both the register file 314 and the operand cache 312. In response to an instruction in the instruction buffer 306 being scheduled for execution in the function units 310, the asynchronous operand fetcher 316 provides operands that the asynchronous operand fetcher 316 has fetched for that instruction to the functional units 310 and then discards those operands. It is possible for the asynchronous operand fetcher 316 to stall. In an example, this situation occurs if the asynchronous operand fetcher 316 did not have sufficient opportunity to fetch all of the operands for an instruction by the time it reaches the head of the operand fetcher queue. More specifically, the register file 314 and operand cache 312 have a limited number of read ports, meaning that a limited number of clients are able to read from these entities in a given clock cycle. Priority is given for these ports to instructions that are entering the functional units 310, as opposed to newer instructions that have just been decoded. Therefore, in some instances, there are not enough ports available during the cycles between decoding an instruction and providing that instruction to the functional units 310 to fetch all operands for the instruction into the asynchronous operand fetcher 316.

As described above, the operand cache controller 318 implements an allocation policy and a cache replacement policy. Techniques are provided herein for implementing either or both of the allocation policy and the cache replacement policy. For the allocation policy, such techniques identify whether to allocate a slot in the operand cache 312 for a particular operand. An operand is either an input to an instruction (a register value read by an instruction) or an output from an instruction (a register value that is to be written). In various implementations, an operand is a candidate for allocation into the operand cache 312 in the situation that an instruction is retrieving operands as input (and therefore could cache those operands in the operand cache 312), and/or is generating an operand as output. In other words, both input operands and output operands are candidates for being cached in the operand cache 312. The techniques described herein determine whether a register value that is a candidate for being placed in the operand cache 312 is actually allocated a slot in and placed into the operand cache 312. For the replacement policy, such techniques identify which operand to evict from the operand cache 312 when a new operand is to be placed into the operand cache 312. In various examples, eviction occurs in the situation that an operand is to be placed in the operand cache 312 and there are no free slots in the operand cache 312.

Figure 4:
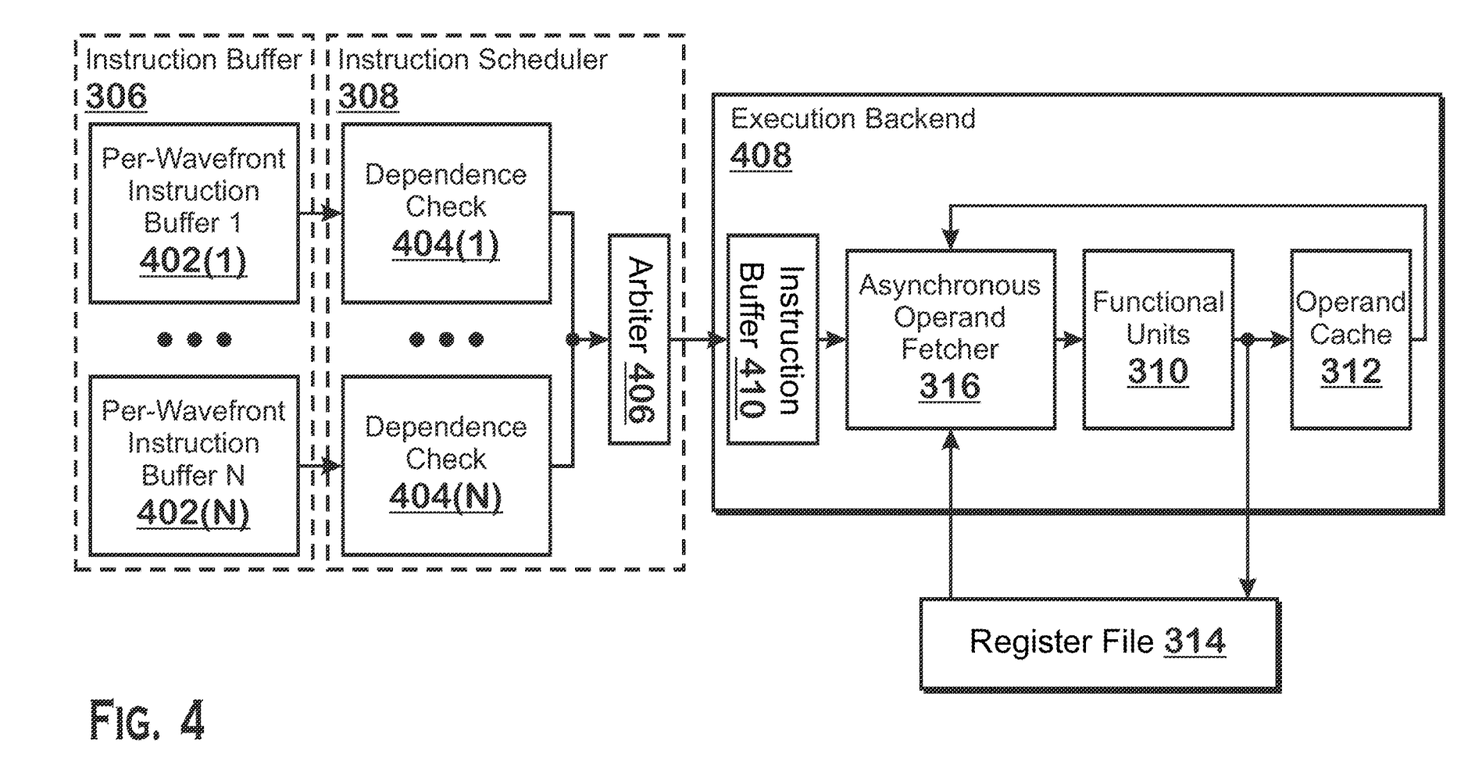
FIG. 4 presents a detailed view of an example implementation of a SIMD unit.

FIG. 4 presents a detailed view of an example implementation of a SIMD unit 138. Note that several elements of FIG. 3 are not shown in FIG. 4 for clarity, but in various implementations, any or all such elements exist. In the example implementation shown, the instruction buffer 306 includes a plurality of per-wavefront instruction buffers 402, each corresponding to a different wavefront. The instruction scheduler 308 includes a plurality of dependency check blocks 404 and an arbiter 406. The dependency check blocks 404 are each associated with a particular wavefront and check dependencies for upcoming instructions for the associated wavefront. A dependency of an instruction is a reliance on a result value output by a previous instruction in program order. Dependencies are satisfied for an instruction if the operands of that instruction have been written out by previous instructions and are not satisfied if at least one operand of that instruction has not been written out by a previous instruction.

The arbiter selects a wavefront with instructions having satisfied dependencies according to a scheduling policy and forwards the instructions to the execution backend 408. The execution backend 408 buffers the instructions in the execution backend instruction buffer 410 and, after buffering, transmits the instructions to the asynchronous operand fetcher 316 to fetch the operands of the instructions. The execution backend instruction buffer 410 exists to decouple the instruction scheduler 308 from the execution backend 408. More specifically, the execution backend instruction buffer 410 decouples the rate at which the arbiter 406 transmits instructions to the execution backend 408 from the rate at which the asynchronous operand fetcher 316 fetches operands for the instructions.

The asynchronous operand fetcher 316 fetches operands for instructions and causes instructions to be transmitted to the functional units 310 when operands for those instructions have been fetched. The functional units 310 execute the instructions and output the results. The operand cache 312 determines whether to allocate a slot in the operand cache 312 for the results or in response to operand fetcher 316 reads, and, if replacement is needed, determines what operand to evict from the operand cache 312. In some circumstances, the results are provided to the register file 314 regardless of whether the results are written to the operand cache 312. In other circumstances, the results are provided to the register file 314 when an eviction from the operand cache 312 occurs or in the case it is determined not to place the results in the operand cache 312.

Referring to both FIGS. 3 and 4, and as described above, the operand cache 312 determines whether to allocate a slot in the operand cache 312 for the results of instructions or for the inputs of instructions. This determination is performed in response to a functional unit 310 providing an instruction result to the operand cache 312 or in response to the operand fetcher 316 reading a value from the register file 314.

In some implementations, the operand cache 312 uses a lookahead technique to determine whether to allocate a slot in the operand cache 312 for an instruction operand. A discussion of the lookahead technique is now provided. To perform the lookahead technique to determine whether to allocate a slot in an operand cache 312, the operand cache 312 examines one or more buffering structures to determine if there is an instruction that accesses the instruction operand, where "access" means a read or write of the operand. In various implementations, any one or more buffering structures are used. Example buffering structures include the per-wavefront instruction buffer 402, the execution backend instruction buffer 410, and the asynchronous operand fetcher 316. Because these buffering structures include upcoming instructions, examination of such structures for instructions that access instruction operands provided to the operand cache 312 allows the operand cache 312 to determine whether such instruction operands will be accessed in the near future. If there is no match in a buffering structure, then the operand cache 312 does not allocate a slot for the instruction operand and if there is a match in the buffering structure, then the operand cache 312 does allocate a slot for the instruction operand. In some implementations, the operand cache 312 examines only the oldest instructions (e.g., oldest X number of instructions, where X is a number set in any technically feasible manner and is less than the in one or more buffering structures, so that circuit complexity for the check is reduced.

The above disclosure describes techniques to determine which instruction operands should be given a slot in the operand cache 312. However, in some implementations, the above techniques are alternatively or additionally used to implement a cache replacement policy for the operand cache 312. More specifically, in response to the operand cache 312 determining that a new register value is to be placed in the operand cache 312, and in response to a determination that any entry is to be evicted for the new register value, the operand cache 312 examines the buffering structures to determine which register value to evict from the operand cache 312. In some implementations, any register value that is not used as an operand by any of the instructions in any buffering structure is a candidate for eviction, and the operand cache 312 selects any such register value for eviction based on any technically feasible removal policy. In some implementations, any register value that is not used as an operand by the N oldest instructions in any buffering structure is a candidate for eviction. The value "N" is a value that is set in any technically feasible manner.

Figure 5:
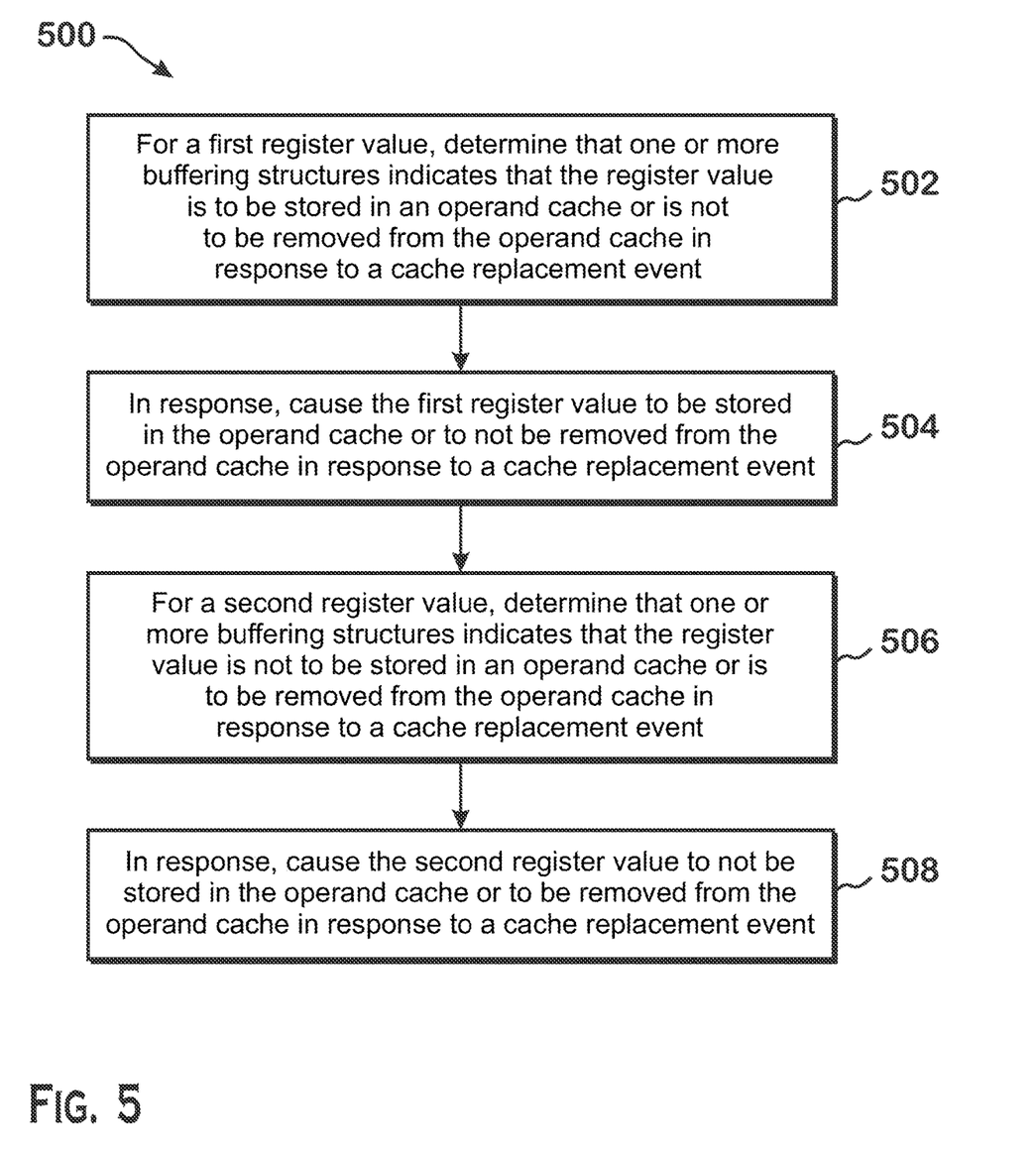
FIG. 5 is flow diagram of a method for determining whether to place instruction operands into an operand cache in response to an instruction accessing an operand or to evict register values from the operand cache in response to a cache replacement event, according to an example.

FIG. 5 is flow diagram of a method 500 for determining whether to place instruction operands into an operand cache 312 in response to an instruction completing or to evict register values from the operand cache 312 in response to a cache replacement event, according to an example. Although described with respect to the system of FIGS. 1-4, those of skill in the art will understand that any system, configured to perform the steps of the method 500 in any technically feasible order, falls within the scope of the present disclosure.

The method 500 begins at step 502, where the operand cache 312 determines, for a first register value, that one or more buffering structures indicates that the first register is to be stored in the operand cache 312 or is not to be removed from the operand cache in response to a cache replacement event. More specifically, the first register value is either an operand from an executed instruction or an operand from an operand fetcher 316 read (for operand cache allocation) or is a value already in the operand cache (for cache replacement). The one or more buffering structures include any structures that store instructions to be executed or information regarding operands accessed by instructions to be executed. Example buffering structures include the execution backend instruction buffer 410 and the instruction buffer 306. These buffering structures store the operands for upcoming instructions, thus allowing the operand cache 312 to determine whether the register value of step 502 will be used by one or more upcoming instructions. At step 502, the operand cache 312 determines that this register value is to be accessed by one of the instructions in the buffering structures, and thus that the register value is to be stored in the operand cache 312 (for allocation) or is not to be evicted from the operand cache 312 (for cache replacement).

At step 504, in response to step 502, the operand cache 312 causes the first register value to be stored in the operand cache (for operand cache allocation) or causes the first register value to not be evicted from the operand cache 312 in response to a cache replacement event. A cache replacement event is an event in which the operand cache 312 determines that a new register value is to be stored in the operand cache 312 but that there are no available slots in the operand cache 312 for that new register value. In response to that determination, the operand cache 312 determines that a register value already in the operand cache 312 is to be replaced, and thus the operand cache 312 identifies a register value to evict from the operand cache 312. Step 502 results in the first register value not being evicted from the operand cache 312 in response to a cache replacement event, meaning that a different register value is evicted from the operand cache 312.

At step 506, for a second register value, the operand cache 312 determines that one or more buffering structures indicates that a second register value is not to be stored in the operand cache 312 or that the second register value is to be removed from the operand cache 312 in response to a cache replacement event. In one implementation, at step 506, the one or more buffering structures includes no instructions that access the second register value. In another implementation, the oldest N instructions in each of the one or more buffering structures includes no instructions that access the second register value. At step 508, in response to step 506, the operand cache 312 causes the second register value to not be stored in the operand cache (for allocation) or to be removed from the operand cache 312 in response to a cache replacement event.

In this description, it is sometimes stated that the operand cache 312 (or other entity) determines whether an instruction accesses or uses a register value that is an operand for another instruction. Such language means any situation in which the register that is an operand of a later instruction is also the operand of an older instruction. In various examples, these situations include the younger instruction reading a register written by the older instruction, the younger instruction reading a register that was placed into the operand cache 312 due to a read by the older instruction, the younger instruction overwriting a register written by the older instruction, or the younger instruction overwriting a register that was laced into the operand cache 312 due to a read by the older instruction.

In addition to techniques based on the buffering structures, in various implementations, the operand cache 312 alternatively or additionally uses a prediction technique based on operand reuse distance to determine whether a register value should be allocated into the operand cache 312 or whether a register value should be evicted from the operand cache 312. The term "reuse distance" is defined as the distance between two instructions of specified types. In some implementations, the reuse distance is the distance (i.e., number of cycles, number of reads or writes, number of writes, or the like) between two reads (where a read is a read of a register value). In other implementations, the reuse distance refers to the distance between when a register value is written to a register and when the register value is read. In other implementations, the reuse distance refers to the distance between two writes. In yet other implementations, reuse distance is defined in any other technically feasible manner.

Register values with historically lower reuse distances are more likely to be used again in the future and thus the operand cache 312 tends to cache such register values. Register values with historically higher reuse distances are less likely to be read in the future and thus the operand cache 312 tends to not cache such register values. In an implementation, the operand cache 312 tracks reuse distances for all or a subset of registers. Registers with reuse distances below a threshold are allocated slots in the operand cache 312 or are prevented from being evicted in response to a cache replacement event. Registers with reuse distances above a threshold are not allocated slots in the operand cache 312 and are not prevented from being evicted in response to a cache replacement event.

Figure 6:
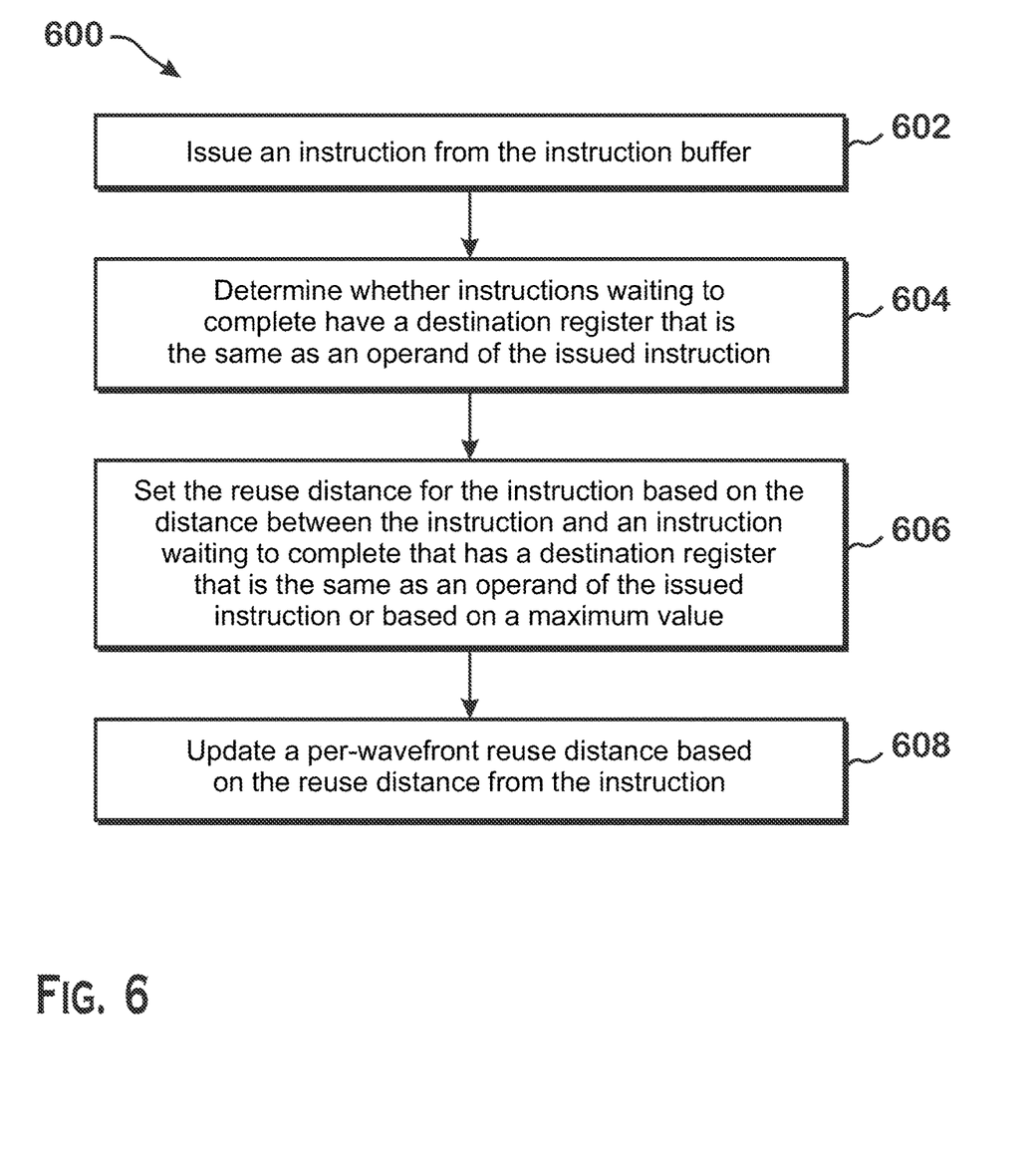
FIG. 6 is a flow diagram of a method for determining reuse distance for a register value, according to an example.

FIG. 6 is a flow diagram of a method 600 for determining reuse distance for a register value, according to an example. Although described with respect to the system of FIGS. 1-4, those of skill in the art will understand that any system, configured to perform the steps of the method 600 in any technically feasible order, falls within the scope of the present disclosure.

The method 600 begins at step 602, where the instruction scheduler 308 issues an instruction to the functional units 310 from the instruction buffer. At step 604, the instruction scheduler 308 determines whether instructions that have been issued to the functional units 310 and are waiting to complete in the functional units 310 have an operand that is the same as an operand of the instruction issued at step 602. In some implementations, the instruction scheduler 308, such as the dependence check units 404, stores a set of identifications of destination registers for instructions that are outstanding in the functional units 310 (or execution backend 408). A destination register is a register to which the result value of an instruction is to be stored. Thus these registers represent writes for older instructions than the instruction issued in step 602.

At step 604, the instruction scheduler 308 determines whether instructions waiting to complete have an operand that is the same as an operand of the issued instruction. As described above, the instruction scheduler 308 stores a set of identification registers of outstanding instructions. The instruction scheduler 308 uses that set to determine whether the register for an operand of the instruction received at step 602 is the same as a destination register written to be an outstanding instruction. In some implementations, the instruction scheduler 308 does not store these destination registers, and these destination registers are stored in a different location.

At step 606, the instruction scheduler 308 sets the reuse distance for one or more operands of the instruction. More specifically, if there is a match between an operand register and a destination register (i.e., the operand register for the instruction of step 602 is the same as a destination register for the instructions tracked by the instruction scheduler 308), then the instruction scheduler 308 notes the distance between the two instructions that match as the reuse distance for the operand register. In some implementations, the distance between the two instructions is the number of instructions, in program order, between the two instructions. If there is no match between an operand register and a destination register, then the instruction scheduler 308 sets the reuse distance for the operand register for which there is match to a default value.

At step 608, the instruction scheduler 308 updates a per-wavefront reuse distance based on the reuse distance for the instruction. The per-wavefront reuse distance is a reuse distance for a particular wavefront. In various implementations, the instruction scheduler 308 maintains a set of per-wavefront reuse distances, one for each wavefront that is executing. Thus, in some implementations, the reuse distance for each of a set of registers is tracked.

Although a per-wavefront reuse distance is described, in some implementations, the reuse distance is stored on a per-register basis, instead of on a per-wavefront basis.

Figure 7:
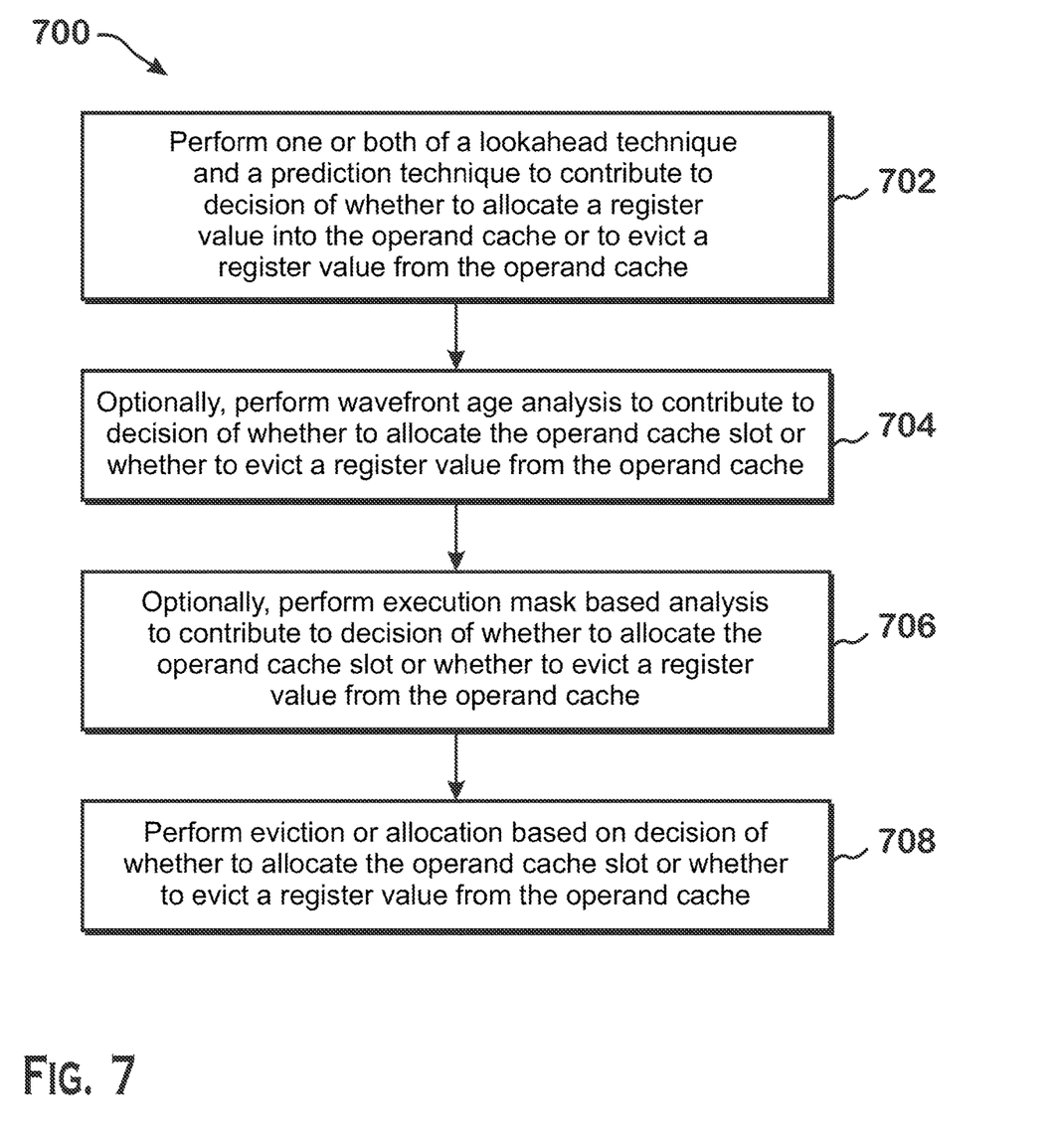
FIG. 7 is a flow diagram of a method for determining whether a register value is to be allocated into or evicted from an operand cache, according to an example

FIG. 7 is a flow diagram of a method 700 for determining whether a register value is to be allocated into or evicted from an operand cache 312, according to an example. Although described with respect to the system of FIGS. 1-4, those of skill in the art will understand that any system, configured to perform the steps of the method 700 in any technically feasible order, falls within the scope of the present disclosure.

The method 700 begins at step 702, where the operand cache 312 performs one or both of a lookahead technique and a prediction technique to contribute to a decision of whether to allocate a register value into the operand cache 312 or to evict the register value from the operand cache 312. A lookahead technique is a technique in which the operand cache 312 examines one or more buffering structures to identify whether a younger instruction waiting to execute uses, as an operand, the register value for which the decision of step 702 occurs. As described elsewhere herein, a buffering structure is a memory that stores information about instructions that are in the SIMD unit 138 (i.e., have already been fetched by the instruction fetch unit 302) and that are waiting to execute or that are in the process of executing. Example buffering structures include the instruction buffer 306 and the execution backend instruction buffer 410. An example lookahead technique is presented in FIG. 5. A prediction technique is a technique in which the operand cache 312 examines a prediction mechanism to determine whether a register value is to exist in the operand cache 312. An example prediction technique is presented in FIG. 6. In that example, a reuse distance is determined. Based on a comparison of the reuse distance to a threshold, the operand cache 312 determines whether a register value is to exist in the operand cache 312. In the disclosure herein, it is possible to use either a per-wavefront reuse distance or a per-register reuse distance. If a per-wavefront reuse distance is determined (e.g., as the weighted average reuse distance in FIG. 6), then the reuse distance for the comparison is the reuse distance for the wavefront from which the instruction whose result is being analyzed executed. If a per-register reuse distance is determined, then the reuse distance for the comparison is the reuse distance for the register being analyzed.

In the discussion of step 702, the phrase "a register value is to exist in the operand cache 312" or a similar phrase refers to either allocating a slot for the register value if the method 700 is used to determine whether to allocate a register value into the operand cache 312 or not evicting a register value from the operand cache 312 if the method 700 is used to determine whether to evict a register value from the operand cache 312. There are several possible ways in which step 702 is performed.

In one example way, a lookahead technique is used without a prediction technique. In this example way, if the lookahead technique indicates that an upcoming instruction will use the register value, then the operand cache 312 determines that the register value is to exist in the operand cache 312, and if the lookahead technique indicates that no upcoming instruction will use the register value, then the operand cache 312 determines that the register value is not to exist in the operand cache 312. In another example way, a prediction technique is used without a lookahead technique. In such an example, if the prediction technique indicates that the register value is likely to be reused in the near future (i.e., the reuse distance is below a threshold), then the operand cache 312 determines that the register value is to exist in the operand cache 312 and if the prediction technique indicates that the register value is not likely to be reused in the near future (i.e., the reuse distance is not below the threshold), then the operand cache 312 determines that the register value is not to exist in the operand cache 312.

In yet another example, a lookahead technique is used in conjunction with a prediction technique to determine whether the register value is to exist in the operand cache 312. According to one version of such an example, both techniques are performed, and if either technique indicates that the register value should exist in the operand cache 312, then the operand cache 312 determines that the register value should exist in the operand cache 312. In this version, if neither technique indicates that the register value should exist in the operand cache 312, then the operand cache 312 determines that the register value should not exist in the operand cache 312. In another version of such an example, both techniques are performed, and if both techniques indicate that the register value should exist in the operand cache 312, then the operand cache 312 determines that the register value should exist in the operand cache. If one or both techniques indicate that the register value should not exist in the operand cache 312, then the operand cache 312 determines that the register value should not exist in the operand cache 312.

In another version of the example technique where a lookahead technique is used in conjunction with a prediction technique, each technique produces a score and the scores are combined to determine whether the register value should exist in the operand cache 312. In an example, the lookahead technique produces a score from a minimum value to a maximum value based on whether there is an instruction in a buffering structure and the age of that instruction. In an example, if there is no instruction in a buffering structure, then the operand cache 312 assigns the minimum value as the score for the lookahead technique. If there is an instruction in a buffering structure, then the operand cache 312 assigns a score from a lower value to the maximum value based on how soon that instruction will be executed. An instruction that is to be executed in the near future is given a score that is higher than an instruction that is to be executed in the farther future. In an example, the prediction technique assigns a score based on the average reuse distance for the register. A lower reuse distance results in a higher score and a higher reuse distance results in a lower score. The operand cache 312 averages both scores together, with optional weighting, and determines whether the average is above a threshold. If the average is above the threshold, then the operand cache 312 determines that the register should exist in the operand cache 312 and if the average is not above the threshold, then the operand cache 312 determines that the register should not exist in the operand cache.

At step 704, which is optional, the operand cache 312 performs wavefront age analysis to contribute to the decision of whether the register should exist in the operand cache 312. Wavefront age analysis includes determining the age of the wavefront that issued the instruction that generated the register value being analyzed. A wavefront that started earlier is older than a wavefront that started later. An older wavefront is given a higher score than a younger wavefront. In one example, the operand cache 312 uses the age analysis to determine whether to "veto" or "approve" the decision made in step 702. More specifically, if the age-based score is below a threshold, then the operand cache 312 determines that the register value should not exist in the operand cache 312 and if the age-based score is not below the threshold, then the operand cache 312 follows the decision made in step 702. In another example, the operand cache 312 combines the age-based score with a score generated at step 702 to produce a decision of whether the register should exist in the operand cache 312. In an example, the combination includes an average or weighted average with the score generated at step 702, with optional normalization of each individual contributing score.

At step 706, which is optional, the operand cache 312 performs execution mask based analysis to contribute to the decision of whether the register should exist in the operand cache 312. Execution mask based analysis includes determining whether the execution mask of the subject wavefront indicates that the instruction result should exist in the operand cache 312, where the "subject wavefront" is the wavefront from which that instruction executed. As described elsewhere herein, an execution mask indicates which lanes of the wavefront are turned on during execution of the instruction. In some examples, the operand cache 312 identifies a percentage of all lanes of the wavefront that are switched on based on the execution mask. In one example, the operand cache 312 vetoes or approves the decision made in steps 702 and 704 based on the score. More specifically, if the score is above a threshold, then the operand cache 312 approves the decision made in steps 702 and 704 and if the score is not above the threshold, then the operand cache 312 vetoes the decision made in steps 702 and 704. In another example, the operand cache combines the score obtained at step 706 with the scores obtained at steps 702 and 704 to obtain a resulting score and decides whether the instruction result is to exist in the operand cache 312 based on the combination. In an example, the scores are averaged (optionally with weights). If the resulting score is above a threshold, then the operand cache 312 determines that the register value is to exist in the operand cache 312 and if the resulting score is not above the threshold, then the operand cache 312 determines that the register value is not to exist in the operand cache 312.

At step 708, the operand cache 312 performs the eviction or allocation based on the decision of whether the instruction result is to exist in the operand cache 312. For allocation, if the decision indicates that the instruction result is to exist in the operand cache 312, then the operand cache 312 allocates the result into the operand cache 312 and if the decision indicates that the instruction result is not to exist in the operand cache 312, then the operand cache 312 does not allocate the result into the operand cache 312. Note that regardless of whether the operand cache 312 allocates an instruction result into the operand cache 312, the register file 314 stores the instruction result.

Herein, an optional step means that in some implementations or modes of execution, the step is performed, and in other implementations or modes of execution, the step is not performed. For example, method 700 describes multiple different methods, where each different method is characterized by different indicates of whether each optional step is performed. For example, in one implementation or mode of execution, each optional step is performed. In another implementation or mode of execution, only one optional step (e.g., 704 or 706) is performed. In yet another implementation or mode of execution, no optional steps are performed.

Any threshold described is determined in any technically feasible manner, such as being pre-set, being determined empirically, or being determined according to a machine learning technique.

In some implementations, the instruction scheduler 308 updates a pre-wavefront reuse distance based on a running average. More specifically, each time that a reuse distance is determined for a register specified by an operand of an instruction, that reuse distance is averaged with the per-wavefront reuse distance already stored for the wavefront that executed the instruction.

In some implementations, the instruction scheduler 308 updates a pre-wavefront reuse distance based on a wavefront execution mask. An execution mask is a mask that indicates which lanes of the wavefront should be executed. More specifically, the instruction scheduler 308 modifies the reuse distance for a register (step 606) based on the execution mask. In one example, this modification includes weighting (multiplying) the reuse distance by the percentage of lanes that are turned on during execution of the instruction according to the execution mask.

In some implementations, the instruction scheduler 308 updates a per-wavefront reuse distance based on the age of a wavefront. Wavefronts that are started earlier are older than wavefronts that are started later. Updating the per-wavefront reuse distance in this manner involves modifying the reuse distance for a register (step 606) based on the age of the wavefront. In an example, a wavefront that is older is assigned a greater weight and a wavefront that is newer is assigned a lower weight. The weight is multiplied by the reuse distance of the instruction (step 606), which is then used to update a per-wavefront reuse distance (step 608).

Note that because some instructions have more than one operand, the method 600 is, in some circumstances, performed multiple times for each instruction. In some implementations, in response to an instruction completing in the functional units 310 and a register value being ready to be written to the register file, the operand cache 312 checks the stored per-wavefront reuse distance for the wavefront that executed the instruction. If the per-wavefront reuse distance is greater than a threshold, then the value is allocated a slot in the operand cache 312. If the per-wavefront reuse distance is not greater than the threshold, then the value is not allocated a slot in the operand cache 312. In some implementations, in response to a replacement event occurring, the operand cache 312 checks the stored per-wavefront reuse distance for register values already stored in the operand cache 312 that are candidates for eviction. The operand cache 312 selects for eviction a register value whose per-wavefront reuse distance is greater than a threshold.

Herein, a statement that the operand cache 312 performs a task means that the operand cache controller 318 performs that task.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, and any of the units within the SIMD unit 138) are, in various implementations, implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for determining whether a register value should be resident in an operand cache, the method comprising:

executing an instruction that accesses an operand that comprises the register value;

generating independent determinations of whether a lookahead technique and a prediction technique indicate that the register value should exist in the operand cache;

generating a lookahead score and a prediction score based on the lookahead technique and the prediction technique;

combining the independent determinations to determine whether the register value should exist in the operand cache, by combining the lookahead score and the prediction score to determine whether the register value should exist in the operand cache; and based on the determining, updating the operand cache.

2. The method of claim 1, wherein performing one or both of the lookahead technique and the prediction technique comprises:

performing a lookahead technique, by examining one or more buffering structures to determine whether an upcoming instruction uses the register value as an input.

3. The method of claim 1, wherein performing one or both of the lookahead technique and the prediction technique comprises:

performing a prediction technique, by determining a reuse distance based on the register value.

4. The method of claim 1, wherein combining the results of the lookahead technique and the prediction technique comprises:
generating a lookahead score and a prediction score based on the lookahead technique and the prediction technique; and
combining the lookahead score and the prediction score to determine whether the register value should be resident in the operand cache.

5. The method of claim 1, wherein:
the register value is not resident in the operand cache; and
updating the operand cache comprises either allocating the register value into the operand cache or not allocating the register value into the operand cache based on the determining.

6. The method of claim 1, wherein:
the register value is resident in the operand cache; and
updating the operand cache comprises either evicting the register value from the operand cache or not evicting the register value from the operand cache, based on the determining.

7. The method of claim 1, further comprising:
performing one or both of a wavefront age analysis and an execution mask based analysis to contribute to determining whether the register value should be resident in the operand cache.

8. An execution unit for determining whether a register value should be resident in an operand cache, the execution unit comprising:
a functional unit configured to execute an instruction that accesses an operand that comprises the register value; and
an operand cache including a cache memory and a cache controller configured to:
generate independent determinations of whether a lookahead technique and a prediction technique indicate that the register value should exist in the operand cache;
generate a lookahead score and a prediction score based on the lookahead technique and the prediction technique;
combine the independent determinations to determine whether the register value should exist in the operand cache, by combining the lookahead score and the prediction score to determine whether the register value should exist in the operand cache; and
based on the determining, update the operand cache by updating the cache memory.

9. The execution unit of claim 8, wherein performing one or both of the lookahead technique and the prediction technique comprises:
performing a lookahead technique, by examining one or more buffering structures to determine whether an upcoming instruction uses the register value as an input.

10. The execution unit of claim 8, wherein performing one or both of the lookahead technique and the prediction technique comprises:
performing a prediction technique, by determining a reuse distance based on the register value.

11. The execution unit of claim 8, wherein combining the results of the lookahead technique and the prediction technique comprises:
generating a lookahead score and a prediction score based on the lookahead technique and the prediction technique; and
combining the lookahead score and the prediction score to determine whether the register value should be resident in the operand cache.

12. The execution unit of claim 8, wherein:
the register value is not resident in the operand cache; and
updating the operand cache comprises either allocating the register value into the operand cache or not allocating the register value into the operand cache based on the determining.

13. The execution unit of claim 8, wherein:
the register value is resident in the operand cache; and
updating the operand cache comprises either evicting the register value from the operand cache or not evicting the register value from the operand cache, based on the determining.

14. The execution unit of claim 8, further comprising:
performing one or both of a wavefront age analysis and an execution mask based analysis to contribute to determining whether the register value should be resident in the operand cache.

15. An execution unit for determining whether a register value should be resident in an operand cache, the execution unit comprising:
a register file configured to store register values that include the register value;
a functional unit configured to execute an instruction that accesses an operand that comprises the register value; and
an operand cache including a cache memory and a cache controller configured to:
generate independent determinations of whether a lookahead technique and a prediction technique indicate that the register value should exist in the operand cache;
generate a lookahead score and a prediction score based on the lookahead technique and the prediction technique;
combining the independent determinations to determine whether the register value should exist in the operand cache, by combining the lookahead score and the prediction score to determine whether the register value should exist in the operand cache, and
based on the determining, update the operand cache by updating the cache memory.

16. The execution unit of claim 15, wherein performing one or both of the lookahead technique and the prediction technique comprises:
performing a lookahead technique, by examining one or more buffering structures to determine whether an upcoming instruction uses the register value as an input.

17. The execution unit of claim 16, wherein performing one or both of the lookahead technique and the prediction technique comprises:
performing a prediction technique, by determining a reuse distance based on the register value.

18. The execution unit of claim 16, wherein combining the results of the lookahead technique and the prediction technique comprises:
generating a lookahead score and a prediction score based on the lookahead technique and the prediction technique; and
combining the lookahead score and the prediction score to determine whether the register value should be resident in the operand cache.

19. The execution unit of claim 16, wherein:
the register value is not resident in the operand cache; and updating the operand cache comprises either allocating the register value into the operand cache or not allocating the register value into the operand cache based on the determining.

20. The execution unit of claim 16, wherein:

the register value is resident in the operand cache; and updating the operand cache comprises either evicting the register value from the operand cache or not evicting the register value from the operand cache, based on the determining.

\* \* \* \* \*